United States Patent
Tseng

(10) Patent No.: US 6,691,968 B1
(45) Date of Patent: Feb. 17, 2004

(54) BRACKET FOR A RECESSED LIGHT

(75) Inventor: Heng-Lun Tseng, Taipei (TW)

(73) Assignee: L & C Lighting Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/234,494

(22) Filed: Sep. 3, 2002

(51) Int. Cl.⁷ .............................................. B42F 13/00
(52) U.S. Cl. ...................................... 248/343; 248/317
(58) Field of Search ............................ 248/317, 318, 248/343, 324, 327, 906, 547; 362/365, 147, 366, 364, 363

(56) References Cited

U.S. PATENT DOCUMENTS

| | | | |
|---|---|---|---|
| 5,075,831 A | * 12/1991 | Stringer et al. | 362/365 |
| 5,588,737 A | * 12/1996 | Kusmer | 362/148 |
| 5,690,423 A | * 11/1997 | Hentz et al. | 362/365 |
| 5,857,766 A | * 1/1999 | Sieczkowski | 362/365 |
| 5,951,151 A | * 9/1999 | Doubeck et al. | 362/365 |
| 6,033,098 A | * 3/2000 | Hentz et al. | 362/430 |
| 6,123,438 A | * 9/2000 | Hentz | 362/373 |

* cited by examiner

*Primary Examiner*—Gwendolyn Baxter
(74) *Attorney, Agent, or Firm*—Dellett & Walters

(57) ABSTRACT

A recessed light bracket includes a base having securing plates punched directly from the base and arranged on two opposite sides of the base so as to form a guiding track and two retainers respectively extending out of the base so that the base is able to be mounted to ceiling supports, a pair of hanger bars respectively and slidably mounted in a corresponding one of the guiding tracks of the base so that the base is adapted to be mounted on ceiling supports, a junction box mounted on a top face of the base for regulating voltage, and a light securing device extending out from a side of the base for holding a light bulb.

18 Claims, 5 Drawing Sheets

BRACKET FOR A RECESSED LIGHT

BACKGROUND OF THE INVENTION

1. Field of the Invention

The present invention relates to a bracket for a recessed light, and more particularly to a bracket with a light securing device extending out of the bracket for holding a light and a junction box securely mounted on the bracket such that the user is able to have capability to use available room in the ceiling for mounting a recessed light.

2. Description of Related Art

A conventional recessed light bracket (5) is shown in FIG. 5 and has a through hole (51) defined through the bracket (5), a light securing ring (52) securely fitted with a periphery defining the through hole (51) for holding a light bulb in the bracket (5) and a junction box (53) mounted on a top face of the bracket (5). A pair of supporting tracks (54) is provided on opposite sides of the bracket (5) such that the user is able to mount the recessed light bracket (5) in ceiling supports (not shown) with the supporting tracks (54).

When this kind of conventional recessed light bracket (5) is in use and the space remaining in the ceiling is limited, the user will have difficulty trying to mount the bracket (5). That is, a space defined in the ceiling must have a dimension at least the same as a dimension of the bracket (5), otherwise the space in the ceiling is not able for fitting the bracket (5). Because the light securing ring (52) is directly mounted in the through hole (51) of the bracket (5), the space must be large enough for receiving the bracket (5). Therefore, if the space is not enough, the user will have to abandon setting up a recessed light in certain locations in the ceiling.

Related information is, for example, the U.S. Pat. No. 5,690,423 issued to Hentz et. al. on Nov. 25, 1997.

To overcome the shortcomings, the present invention tends to provide an improved bracket for a recessed light to mitigate and obviate the aforementioned problems.

SUMMARY OF THE INVENTION

The primary objective of the present invention is to provide an improved bracket for a recessed light. The bracket has a base and a light securing device extending out of the base so that the bracket is compact and available for fitting in a compact space.

Another objective of the present invention is that the light securing device is a bar with two distal ends securely connected to the base and an annular portion for engaging with a light bulb.

Still another objective of the present invention is that the light securing device is a disk with a portion thereof securely engaged with a bottom face of the base.

A further objective of the present invention is that the light securing device further has a retainer oppositely provided on the base so that there is no need for hanger bars to support the bracket.

Other objects, advantages and novel features of the invention will become more apparent from the following detailed description when taken in conjunction with the accompanying drawings.

DETAILED DESCRIPTION OF THE PREFERRED EMBODIMENT

Figure 1:
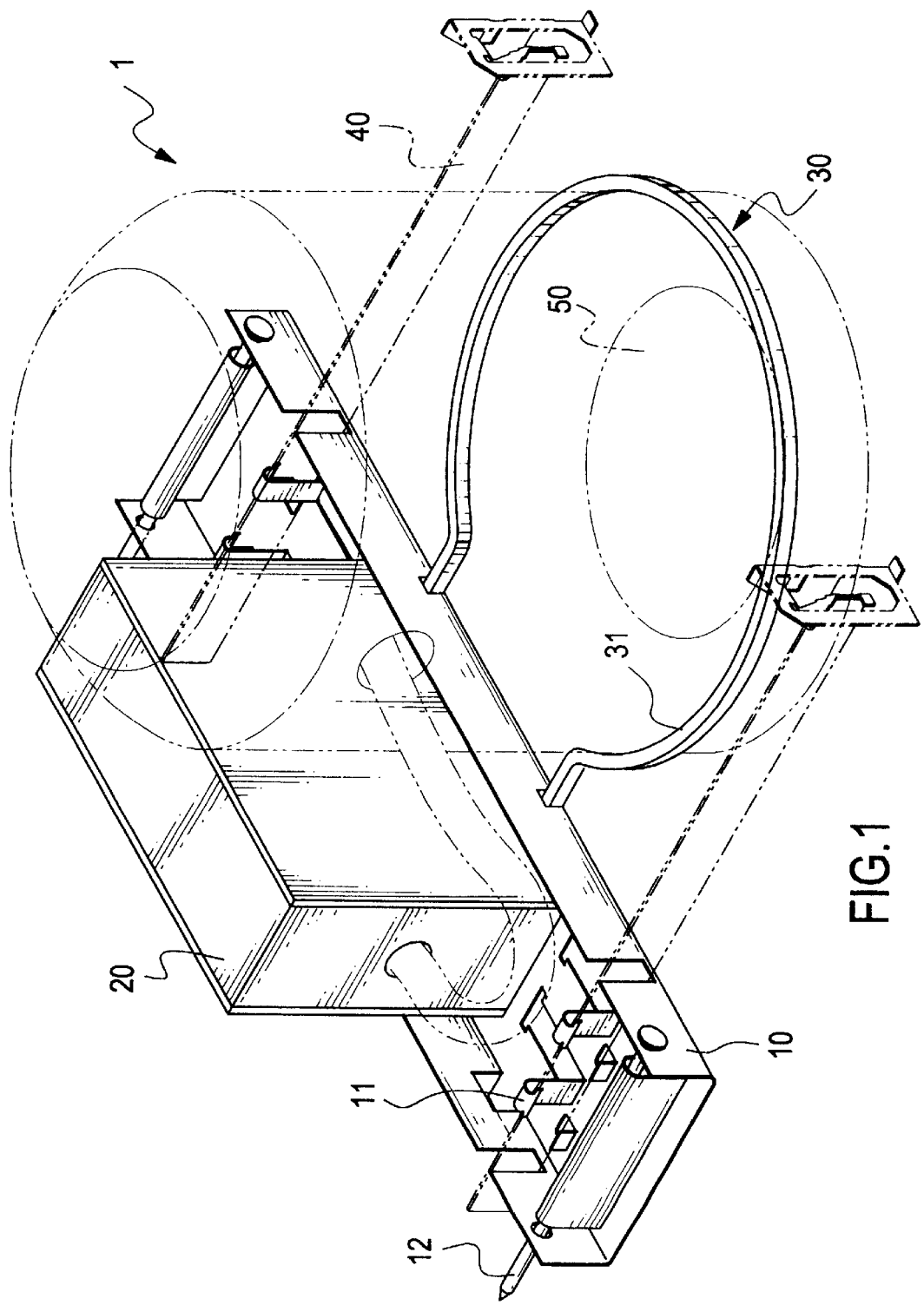
FIG. 1 is a perspective view of a preferred embodiment of the recessed light bracket of the present invention.

With reference to FIG. 1, the recessed light bracket (1) in accordance with the present invention has a base (10), a junction box (20), a light securing device (30) and a pair of hanger bars (40) horizontally extending through the base (10).

The base (10) has securing plates (11) punched directly from the base (10) and arranged on two opposite sides of the base (10) so as to form a guiding track respectively to correspond to one of the pair of hanger bars (40). The base (10) further has two retainers (12) oppositely and respectively extending out of the base (10) so that the base (10) is able to be mounted to ceiling supports (not shown). The provision of the hanger bars (40) is to allow the user to mount the recessed light bracket onto ceiling supports and because each of the hanger bars (40) is composed of a first section and a second section engaged with and slidable relative to the first section, the user is able to adjust length of each of the hanger bars (40) to adapt to the room available in the ceiling supports. However, since how the hanger bar (40) work and what the hanger bar (40) is composed of are not the focus of the present invention, detailed description thereof is thus omitted.

The junction box (20) is mounted on a top face of the base (10) for providing power to a light bulb (50).

The light securing device (30) is a bar and has two distal ends securely connected to a side of the base (10) and an annular portion (31) integrally formed with the two distal ends sodas to form a loop for mounting the light bulb (50). The pair of hanger bars (40) is respectively and slidably mounted in the corresponding one of the guiding tracks of the base (10) so that the user is able to use the hanger bars (40) to mount the recessed light bracket of the present invention to the ceiling supports.

It is to be noted that because the light bulb (50) is mounted aside the base (10), the user only needs to have a space with a dimension the same as that of the base (10) such that the space in the ceiling is used effectively. However, when the space is not suitable for the hanger bars (40), the user may neglect the hanger bars (40) and choose the retainers (12) instead. Preferably, the retainers (12) are nails so that the user may directly use the retainers (12) to mount the recessed light bracket onto the ceiling supports.

Figure 2:
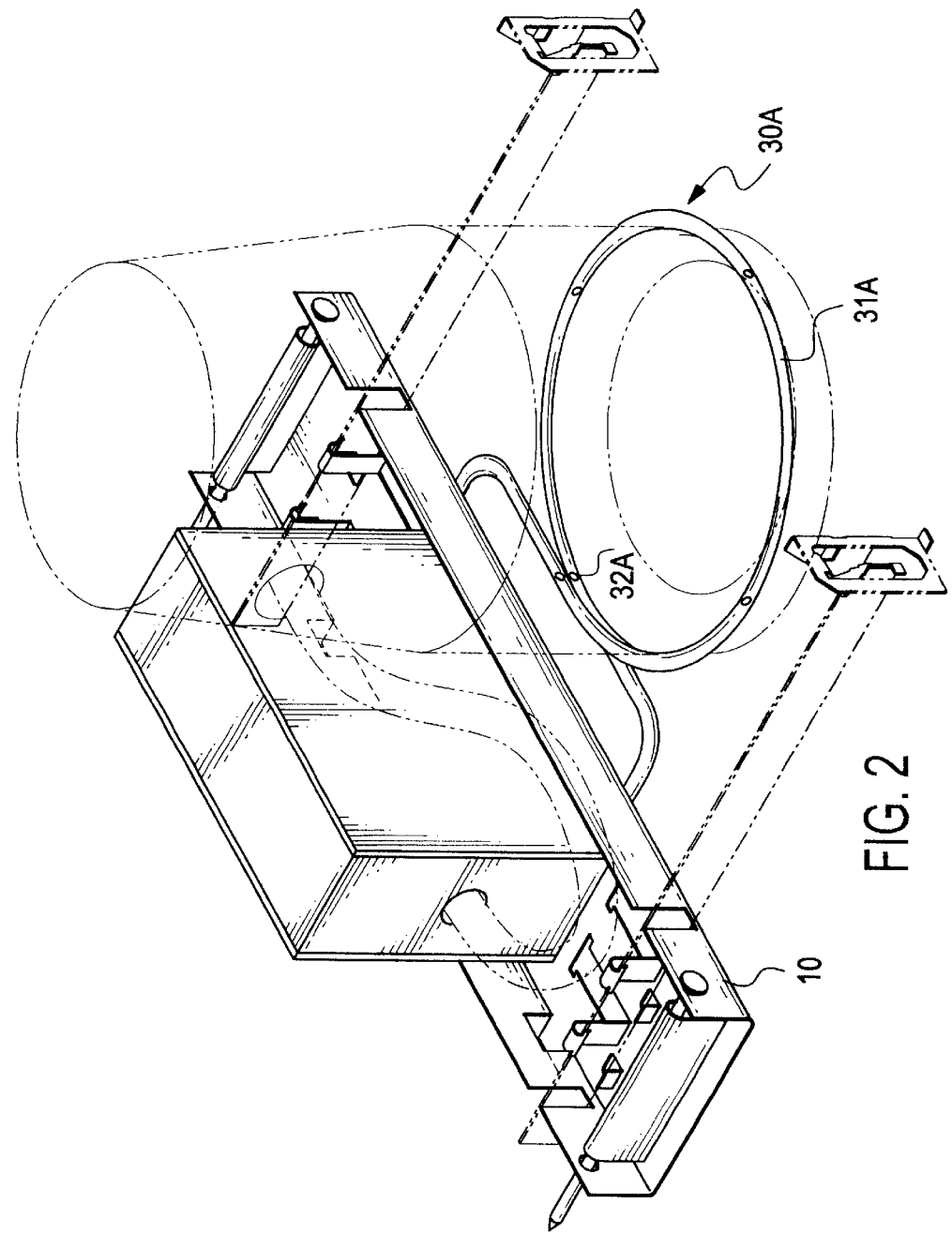
FIG. 2 is a perspective view of a preferred embodiment of the recessed light bracket of the present invention.

With reference to FIG. 2, it is noted that the light securing device (30A) also has two distal ends securely connected to the side of the base (10), an annular portion (31A) and a joint (32A) of the two distal ends.

Figure 3:
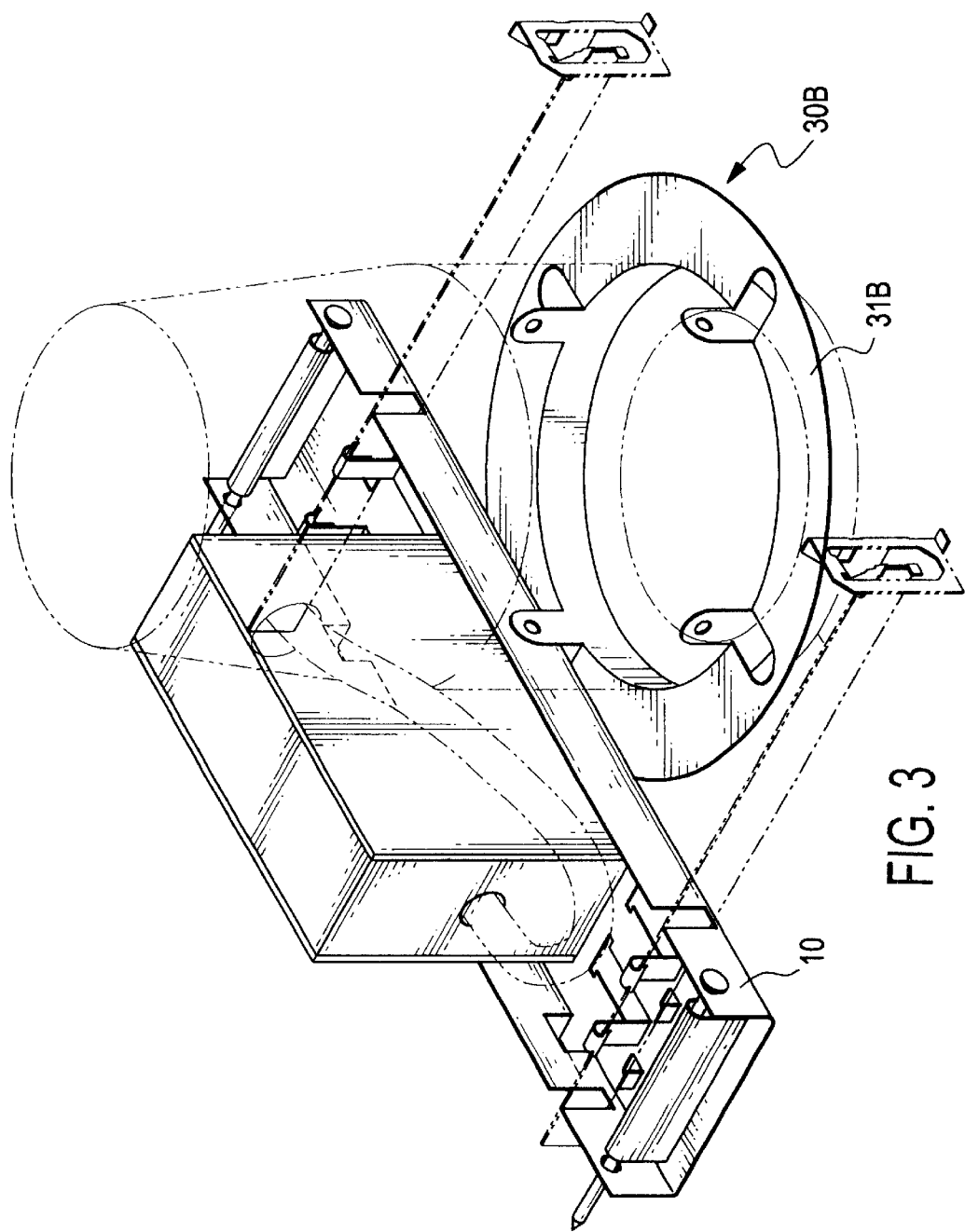
FIG. 3 is a perspective view of a preferred embodiment of the recessed light bracket of the present invention.

With reference to FIG. 3, the light securing device (30B) is a hollow disk (31B) with one side thereof securely connected to a bottom face of the base (10).

Figure 4:
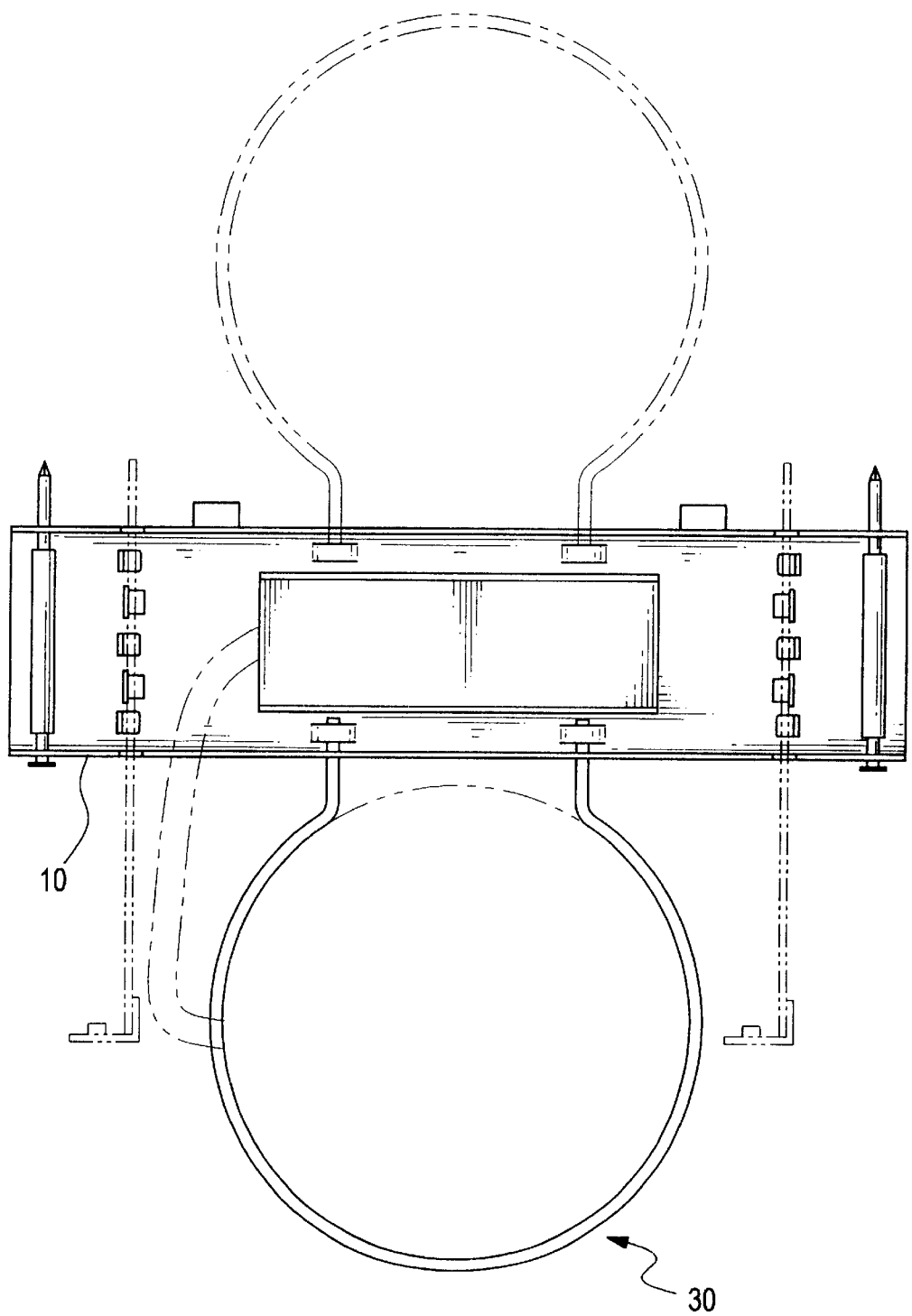
FIG. 4 is a top plan view showing that the bar can be mounted on either side of the base so that the user may have choices for mounting the recessed light depending on where the space in the ceiling is.
Figure 5:
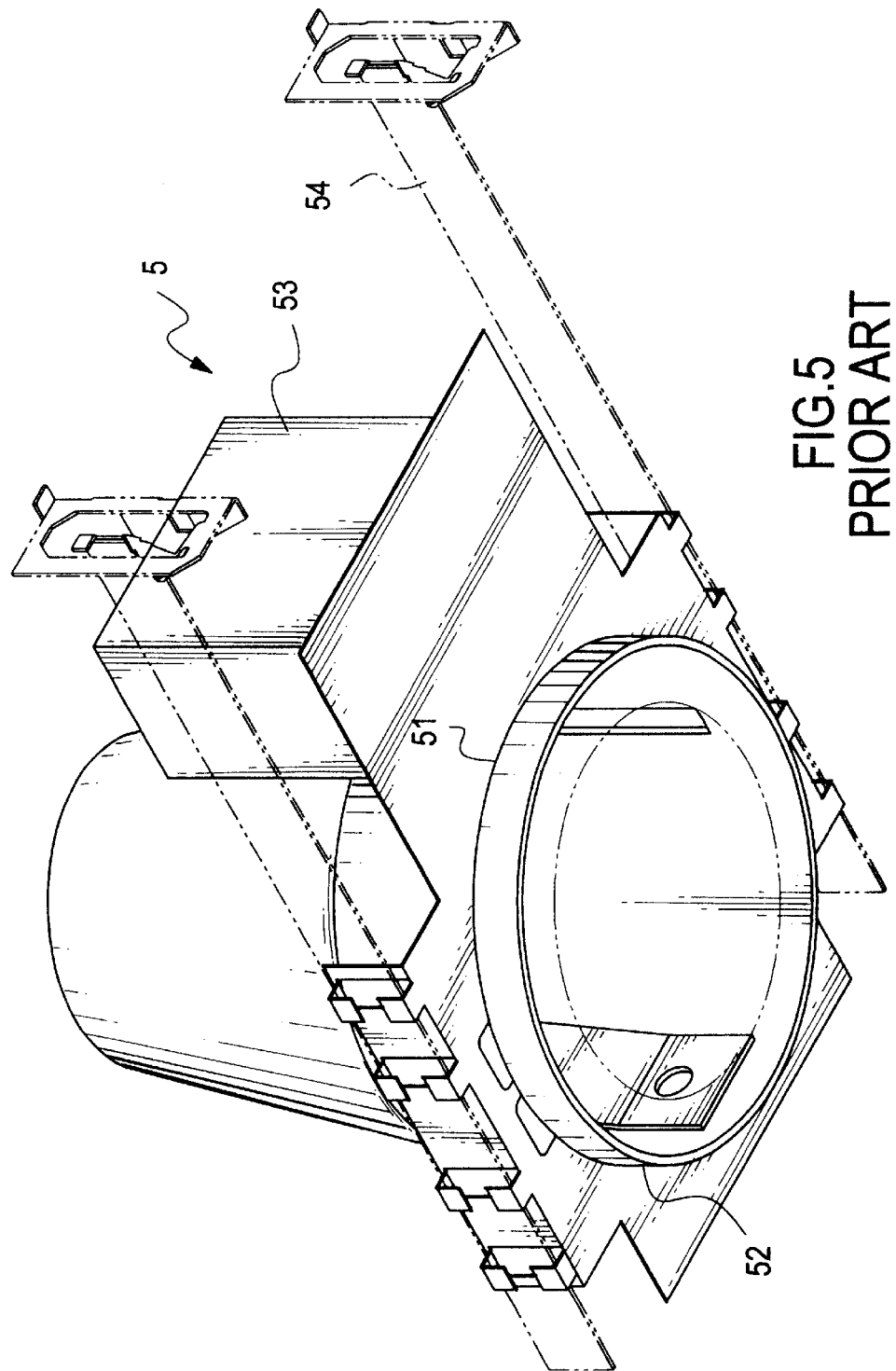
FIG. 5 is a perspective view of a conventional recessed light bracket.

With reference to FIG. 4, when required, the light securing device (30) can be mounted on other side of the base (10) according to the space available in the ceiling.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A recessed light bracket comprising:

a base having securing plates punched directly from the base and arranged on two opposite sides of the base so as to form a guiding track and two retainers oppositely and respectively extending out of the base so that the base is able to be mountable to ceiling supports via use of said guiding track, the base further having retainer receiving portions defined on two opposite sides of the base so as to form portions for receiving mounting retainers other than said guiding track therein;

a junction box mounted on a top face of the base for regulating voltage; and a light securing device extending out from a side of the base for holding a light bulb.

2. The recessed light bracket as claimed in claim 1, wherein the light securing device has two distal ends securely connected to a side of the base and an annular portion integrally formed with the two distal ends so as to form a loop for mounting the light bulb.

3. The recessed light bracket as claimed in claim 2, wherein said annular portion is substantially and free from engagement with a hangar bracket.

4. The recessed light bracket as claimed in claim 1, wherein the light securing device is a hollow disk.

5. The recessed light bracket as claimed in claim 1, further comprising a pair of hanger bars horizontally and oppositely extending through the base and slidably mounted in a corresponding one of the guiding tracks of the base so that the base is adapted to be mounted on the ceiling supports.

6. The recessed light bracket as claimed in claim 5, wherein said mounting retainers comprise nails.

7. The recessed light bracket as claimed in claim 1, wherein said mounting retainers comprise nails.

8. The recessed light bracket as claimed in claim 1, wherein said light securing device is a bar and has two distal ends securely connected to a side of the base and an annular portion integrally formed with the two distal ends so as to form a loop for mounting the light bulb.

9. The recessed light bracket as claimed in claim 8, wherein said annular portion is substantially and free from engagement with a hangar bracket.

10. The recessed light bracket as claimed in claim 8, wherein said annular portion is substantially self-supporting at a segment most distant from said two distal ends.

11. A recessed light bracket comprising:

a base having securing plates punched directly from the base and arranged on two opposite sides of the base so as to form a guiding track and two retainers oppositely and respectively extending out of the base so that the base is able to be mountable to ceiling supports via use of said guiding track;

a junction box mounted on a top face of the base for regulating voltage; and a light securing device extending out from a side of the base for holding a light bulb, wherein said light securing device and has two distal ends securely connected to a side of the base and an annular portion integrally formed with the two distal ends so as to form a loop for mounting the light bulb, wherein said annular portion most distant from said two distal ends is substantially and free from engagement with a hangar bracket.

12. The recessed light bracket as claimed in claim 11, wherein the light securing device is a bar.

13. The recessed light bracket as claimed in claim 11, wherein the light securing device is a hollow disk.

14. The recessed light bracket as claimed in claim 11, further comprising a pair of hanger bars horizontally and oppositely extending through the base and slidably mounted in a corresponding one of the guiding tracks of the base so that the base is adapted to be mounted on the ceiling supports.

15. The recessed light bracket as claimed in claim 14, wherein said base further has retainer receiving portions defined on two opposite sides of the base so as to form portions for receiving mounting retainers other than said guiding track therein.

16. The recessed light bracket as claimed in claim 15, wherein said mounting retainers comprise nails.

17. The recessed light bracket as claimed in claim 11, wherein said light securing device is a bar and has two distal ends securely connected to a side of the base and an annular portion integrally formed with the two distal ends so as to form a loop for mounting the light bulb.

18. The recessed light bracket as claimed in claim 17, wherein said annular portion is substantially and free from engagement with a hangar bracket.

* * * * *